Patented Jan. 8, 1935

1,987,570

UNITED STATES PATENT OFFICE 1,987,570

COATING COMPOSITION

Herman Alexander Bruson, Germantown, Pa., assignor to The Resinous Products & Chemical Company, Inc., Philadelphia, Pa.

No Drawing. Application July 28, 1930, Serial No. 471,420

12 Claims. (Cl. 134—79)

This invention relates to coating compositions containing a cellulosic derivative—for example, nitro-cellulose, and certain metallic salts of organic ketonic acids of the general formula

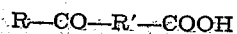

where R and R' represent aromatic nuclei.

In my co-pending patent applications, Serial Nos. 378,184 and 469,930 I have described the preparation and properties of such salts. These salts are readily prepared by treating an organic acid of the general formula

where R and R' represent aromatic nuclei, such as, for example, para-toluyl-orthobenzoic acid,

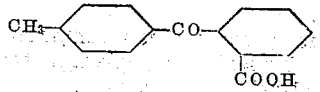

with an alkali hydroxide so as to form a water-soluble salt, and reacting upon the latter with a neutral water-soluble salt of a polyvalent metal. By the term "polyvalent metal" is meant a metal which is a member of the group consisting of aluminum, barium, cadmium, calcium, cerium, chromium, cobalt, copper, iron, lead, magnesium, manganese, mercury, strontium, nickel, thallium, thorium, tin, uranium, vanadium and zinc. Depending upon the conditions of alkalinity, water-insoluble, polyvalent metal salts of the above organic acids are obtained, which are either neutral, basic, or mixed neutral and basic salts as described in detail in the above co-pending applications.

All of these polyvalent metal salts of the ketonic acids having the general formula

regardless of whether the salts are neutral or basic in nature, are unique in that they are readily soluble in organic solvents and in vegetable and animal oils. For example, they dissolve readily in esters (ethyl acetate, butyl acetate, ethyl lactate, ethyl oxybutyrate); in alcohols (butanol, amyl alcohol); in ethers (diethyl ether, glycol-monoethyl ether, glycol monobutyl-ether); in ketones (acetone, cyclohexanone); in hydrocarbons (benzol, toluol, solvent naphtha, turpentine); in chlorinated solvents (carbon tetrachloride, ethylene dichloride) and in oils (linseed, tung, soya bean, castor, perilla, etc.). Such salts or their solutions may be readily mixed or dispersed in commercial lacquers containing cellulosic derivatives or in oils, paints and varnishes to give homogeneous solutions which possess useful properties. They accelerate the drying of drying oils and varnishes or paints made therefrom, and increase their gloss and hardness. In cellulosic lacquers, they may be used in large amounts, to contribute hardness, adhesion and color to the final film obtained after the solvents have evaporated. Nitro-cellulose films containing from 50% to 300% by weight of the metallic salts herein described based upon the weight of the dry nitro-cellulose content, form very desirable coatings for sanding and finishing, as they show good filling properties, and are useful as surfacers for wood, metal and glass. Such compositions may contain, in addition, inert pigments, resins or plasticizers as commercially used at present.

As illustrating my invention, the following examples are given:

Example 1

A lacquer is prepared from:

| | Grams |
|---|---|
| Nitro-cellulose (½ second) | 20 |
| Butyl acetate | 40 |
| Butanol | 10 |
| Ethyl acetate | 15 |
| Toluol | 50 |
| Aluminum salt of p-cymoyl-ortho-benzoic acid | 20 |

A clear solution is obtained, which, upon evaporation of the solvents, deposits a clear, adherent, hard film. If desired, plasticizers, such as castor oil, dibutyl phthalate, tri-cresyl phosphate, and other high boiling liquids, may be added to give greater flexibility. Pigments, such as zinc oxide, chrome yellow, and the like, may likewise be added.

In place of the aluminum salt of p-cymoyl-o-benzoic acid, any other polyvalent metal salt of p-cymoyl-o-benzoic acid may be used. The neutral or basic zinc, calcium, lead, thorium, barium, strontium, magnesium and cerium salts are white, and give clear, colorless lacquers, whereas the cobalt, copper, iron, uranium, vanadium and chromium salts are colored, and give colored lacquers. The basic mercury salt is yellow and gives yellowish lacquers.

Example 2

A lacquer is prepared from:

| | Grams |
|---|---|
| Nitro-cellulose | 20 |
| Glycol-monoethyl ether | 40 |
| Butyl acetate | 20 |
| Solvent naphtha | 20 |
| Zinc salt of sec-amylbenzoyl-ortho-benzoic acid | 30 |

A clear solution is obtained, which, upon evaporation of the solvents, deposits a colorless, transparent, hard film having good adhesion.

In place of the neutral zinc salt, the basic zinc salt of sec-amylbenzoyl-ortho-benzoic acid may be used in like amount. The neutral, as well as basic, aluminum, barium, cadmium, calcium, cerium, chromium, cobalt, copper, iron, lead, magnesium, manganese, mercury, strontium, nickel, thallium, thorium, tin, uranium, vanadium and zinc salts of sec-amylbenzoyl-o-benzoic acid may likewise be employed.

It has been found that the polyvalent metal salts, both neutral and basic of organic ketonic acids having the general formula $$R—CO—R'—COOH,$$

all possess this property of being compatible with nitro-cellulose in all proportions. Typical examples of such acids are the following, as well as the isomers, derivatives, homologues, and substitution products thereof—namely, Benzoyl-o-benzoic acid, xyloyl-benzoic acid, ethyl-benzoyl-o-benzoic acid, p-chlorobenzoyl-o-benzoic acid, iso-propyl-benzoyl-o-benzoic acid, p-cymoyl-o-benzoic acid, sec-butylbenzoyl-o-benzoic acid, sec-amyl-benzoyl-o-benzoic acid, ter-amyl-benzoyl-o-benzoic acid, ter-butyl-xyloyl-o-benzoic acid, caprylbenzoyl-o-benzoic acid, p-dichloro-benzoyl-o-benzoic acid, p-hydroxybenzoyl-o-benzoic acid, alpha-naphthoyl-o-benzoic acid, tetrahydronaphthoyl-o-benzoic acid, p-phenylbenzoyl-o-benzoic acid, and the like.

These acids, as well as their derivatives and homologues, are most readily prepared by condensing an aromatic hydrocarbon or its halogen, hydroxy, and hydrogeno - derivatives with phthalic anhydride in the presence of anhydrous aluminum chloride. They are all ketonic acids, and are different in chemical structure and chemical properties from the alkyl half esters of phthalic acid which have already been described and patented by Henning, Burke and Reid, U. S. Patent 1,742,507, 1,742,509 (1930) for use in coating compositions.

Our salts are, for example, exceedingly stable towards hydrolysis since they are not esters. They can be boiled with water for hours and remain substantially unchanged, whereas salts of alkyl half esters of phthalic acid are completely hydrolyzed and broken down.

It is, of course, understood that the examples given herein above are merely illustrative, and that other proportions and solvents may be used. Furthermore, other derivatives of cellulose which are soluble in organic solvents may be used in lieu of nitro-cellulose. These include, for example, cellulose acetate, ethyl-cellulose, benzyl-cellulose, cellulose stearate and the like.

Having thus described my invention and illustrated several embodiments of the practical application thereof, what I claim as new and desire to secure by Letters Patent is:—

1. A coating composition comprising a cellulosic derivative and a polyvalent metal salt of an organic acid of the general formula $$R—CO—R'—COOH$$

where R and R' represent aromatic nuclei directly attached to the carbon atom of the carbonyl group by a nuclear carbon atom.

2. A coating composition comprising nitrocellulose and a polyvalent metal salt of an organic acid of the general formula $$R—CO—R'—COOH$$

where R and R' represent aromatic nuclei directly attached to the carbon atom of the carbonyl group by a nuclear carbon atom.

3. A coating composition comprising a cellulosic derivative and a metallic salt of an organic acid of the general formula $$R—CO—R'—COOH$$

where R and R' are aromatic nuclei directly attached to the carbon atom of the carbonyl group by a nuclear carbon atom; the metallic radicle of said salt being a member of the group consisting of aluminum, barium, cadmium, calcium, cerium, chromium, cobalt, copper, iron, lead, magnesium, manganese, mercury, strontium, nickel, thallium, thorium, tin, uranium, vanadium and zinc.

4. A coating composition comprising nitro-cellulose and a metallic salt of the type described in claim 3.

5. A coating composition comprising a cellulosic derivative and a polyvalent metal salt of an amylbenzoyl-ortho-benzoic acid.

6. A coating composition comprising nitrocellulose and a polyvalent metal salt of an amylbenzoyl-ortho-benzoic acid.

7. A coating composition comprising a cellulosic derivative and a polyvalent metal salt of secondary amylbenzoyl-o-benzoic acid.

8. A coating composition comprising nitro-cellulose and a polyvalent metal salt of secondary amylbenzoyl-o-benzoic acid.

9. A coating composition comprising a cellulosic derivative and a polyvalent metal salt of an alkyl benzoyl-ortho-benzoic acid.

10. A coating composition comprising a cellulosic derivative and a polyvalent metal salt of an aroyl-o-benzoic acid.

11. A coating composition comprising nitrocellulose and a polyvalent metal salt of para-toluyl-ortho-benzoic acid.

12. A coating composition comprising nitrocellulose and a polyvalent metal salt of alpha-naphthoyl-ortho-benzoic acid.

HERMAN ALEXANDER BRUSON.